United States Patent
Broido et al.

(10) Patent No.: US 8,806,157 B2
(45) Date of Patent: *Aug. 12, 2014

(54) ONLINE VOLUME MIGRATION USING MULTI-PATH INPUT / OUTPUT MASQUERADING

(75) Inventors: Yakov Broido, Hod Hasharon (IL); Daniel I. Goodman, Beit Shemesh (IL); Haim Helman, Saratoga, CA (US); Leonid Kull, Yehud (IL); Orit Nissan-Messing, Hod HaSharon (IL); Guy Rozendorn, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/532,984

(22) Filed: Jun. 26, 2012

(65) Prior Publication Data

US 2012/0278572 A1   Nov. 1, 2012

Related U.S. Application Data

(63) Continuation of application No. 13/095,642, filed on Apr. 27, 2011.

(51) Int. Cl.
*G06F 12/16* (2006.01)
*G06F 3/06* (2006.01)

(52) U.S. Cl.
CPC ............ *G06F 3/0635* (2013.01); *G06F 3/0607* (2013.01); *G06F 3/067* (2013.01); *G06F 3/0647* (2013.01)
USPC ........................................................ 711/161

(58) Field of Classification Search
CPC ..... G06F 3/067; G06F 3/0634; G06F 3/0635; G06F 3/0647; G06F 3/0607; G06F 3/0644
See application file for complete search history.

(56) References Cited

U.S. PATENT DOCUMENTS

| | | | |
|---|---|---|---|
| 7,340,572 B2 | 3/2008 | Cochran | |
| 7,484,050 B2 | 1/2009 | Guha et al. | |
| 7,689,799 B2 | 3/2010 | Black | |
| 7,707,186 B2 | 4/2010 | LeCrone et al. | |
| 7,721,044 B1 * | 5/2010 | Chatterjee et al. | ............ 711/114 |

(Continued)

OTHER PUBLICATIONS

Weber, Ralph O. Information technology—SCSI Primary Commands—4 (SPC-4), Jul. 29, 2008, Revision 16, pp. 105-112 and 358-360.*

(Continued)

*Primary Examiner* — April Y Blair
*Assistant Examiner* — Michael C Kolb
(74) *Attorney, Agent, or Firm* — Griffiths & Seaton PLLC

(57) ABSTRACT

A method, including configuring data migration from a first volume to a second volume, which are coupled via a storage area network (SAN) to a host computer, with the first volume mapped to the host computer. A volume identifier associated with the first volume is copied to a memory coupled to the second volume, and the copied volume identifier is retrieved from the memory by the host computer. A state of the second volume is set to inactive, and the inactive second volume is mapped to the host computer. A state of the first volume is set to inactive, and the status is data from the inactive first volume to the inactive second volume. After the copying, data migration is started from the inactive first volume to the inactive second volume, and after the starting, the state of the second volume is set to active.

7 Claims, 2 Drawing Sheets

(56) References Cited

U.S. PATENT DOCUMENTS

| | | |
|---|---|---|
| 7,730,274 B1 | 6/2010 | Usgaonkar |
| 7,793,060 B2 | 9/2010 | Zohar et al. |
| 7,805,566 B2 | 9/2010 | Abouelwafa et al. |
| 7,818,522 B2 | 10/2010 | Bartfai et al. |
| 8,316,161 B1 * | 11/2012 | Contreras et al. ............... 710/38 |
| 2004/0260873 A1 * | 12/2004 | Watanabe ..................... 711/114 |
| 2005/0229021 A1 * | 10/2005 | Lubbers et al. .................. 714/2 |
| 2011/0202737 A1 * | 8/2011 | Takahashi et al. ............ 711/162 |
| 2012/0124309 A1 * | 5/2012 | Watanabe et al. ............. 711/162 |

OTHER PUBLICATIONS

Weber, Ralph O., Working Draft T10/1731-D, "Information Technology—SCSI Primary Commands—4 (SPC-4)", Revision 16, Jul. 29, 2008, pp. 242-258 327-328 339-342.*

Xiaojia Xiang et al., "Storage Virtualization Based Asynchronous Remote Mirror,"IEEE, 978-0-7695-3766-5/09, 2009, pp. 313-318.

* cited by examiner

ONLINE VOLUME MIGRATION USING MULTI-PATH INPUT / OUTPUT MASQUERADING

CROSS-REFERENCE TO RELATED APPLICATIONS

This application is a Continuation of U.S. patent application Ser. No. 13/095,642, filed on Apr. 27, 2011, which is related to the U.S. patent application Ser. No. 13/095,646 titled "Transparent Input/Output Switching Between Mirrored Storage Volumes," filed on even date with the parent application, and which is incorporated herein by reference.

FIELD OF THE INVENTION

The present invention relates generally to data storage, and specifically to seamlessly switching from a source volume to a target volume during data migration.

BACKGROUND OF THE INVENTION

Data migration is a technique employed by data storage facilities for upgrading a source storage system such as a storage controller to a target storage system. To migrate data from a source volume (e.g., a disk drive) of a source storage system to a target volume of a target storage system, the target storage system typically sequentially retrieves data blocks from the source volume, and saves them to the target volume.

Prior to starting data migration, host computers (e.g., database servers) disconnect from the source volume. Once data migration has started, the host computers connect to the target volume. Since there may be a short delay while the host computers disconnect from the source volume and connect to the target volume, the host computers typically shuts down applications, then disconnects from the source volume and connects to the target volume, thereby causing a downtime.

During data migration, if one of the host computers requests a data block that has not yet been migrated, the target storage system may suspend sequentially migrating data blocks from the source volume, migrates the data blocks requested by the host computer, and then resumes sequentially migrating the data blocks from the source volume to the target volume.

SUMMARY OF THE INVENTION

There is provided, in accordance with an embodiment of the present invention a method, including configuring data migration from a first volume to a second volume, which are coupled via a storage area network (SAN) to a host computer, with the first volume mapped to the host computer, by copying a volume identifier associated with the first volume to a memory coupled to the second volume, retrieving, by the host computer, the copied volume identifier from the memory, setting a state of the second volume to inactive, mapping the inactive second volume to the host computer, setting a state of the first volume to inactive, copying status data from the inactive first volume to the inactive second volume, after the copying, starting data migration from the inactive first volume to the inactive second volume, and after the starting, setting the state of the second volume to active.

There is additionally provided, in accordance with an embodiment of the present invention a method, including copying a volume identifier associated with a first volume to a memory coupled to a second volume, and retrieving the copied volume identifier, by a processor coupled to the second volume and the memory, in response to a request to identify the second volume.

BRIEF DESCRIPTION OF THE DRAWINGS

The disclosure is herein described, by way of example only, with reference to the accompanying drawings, wherein.

DETAILED DESCRIPTION OF EMBODIMENTS
OVERVIEW

Typically, volumes stored on disk drives, are coupled to a host computer via logical paths between each of the volumes and the host computer. Each of volumes may have an associated unique volume identifier, such as a serial number. The unique volume identifier can be used to join logical paths associated with each of the volumes. As there are multiple paths associated with the volumes, the volumes comprise multipath devices. Communicating with the multipath devices is referred to as multipath input/output (I/O). Multipath devices are also referred to as MPIO devices.

In embodiments of the present invention, in addition to having an associated volume identifier, each volume may have an associated state, where the state can be either active or inactive. Additionally, the state of each logical path to a volume can be associated with the state of the volume. For example, if the state of a particular volume is active, then the state of all logical paths between the host computer and the particular volume are active. Likewise, if the state of the particular volume is inactive, then state of all logical paths between the host computer and the particular volume are inactive.

While configuring data migration from a first source volume to a second target volume, embodiments of the present invention provide methods and systems for manipulating the volume identifiers and the states of the source and the target volumes, thereby enabling the host computer to seamlessly transition from the source volume to the target volume. In some embodiments, the volume identifier associated the source volume is copied to the target volume, and the state of the target volume's paths is set to inactive. After copying the source volume's volume identifier to the target volume, both volumes are associated with the same volume identifier, and the target volume "masquerades" as the source volume (according to conventions used by the host to uniquely identify volumes and map logical paths to a single multipath device).

Upon mapping the masquerading target volume to the host computer, the host computer detects a single volume with logical paths that are active (i.e., the logical paths between the host computer and the source volume), and new logical paths that are inactive (i.e., the new logical paths between the host computer and the target volume). After swapping the states of the source and target volumes, all the new logical paths to the target volume are active, and all logical paths to the source volume are inactive. Therefore, after swapping the states of the source and target volumes, all input/output operations are redirected to the target volume instead of the source volume.

Upon completing the steps described supra, the host computer still "thinks" it has active logical paths to the source volume, when in fact the active logical paths are now to the target volume.

System Description

Figure 1:
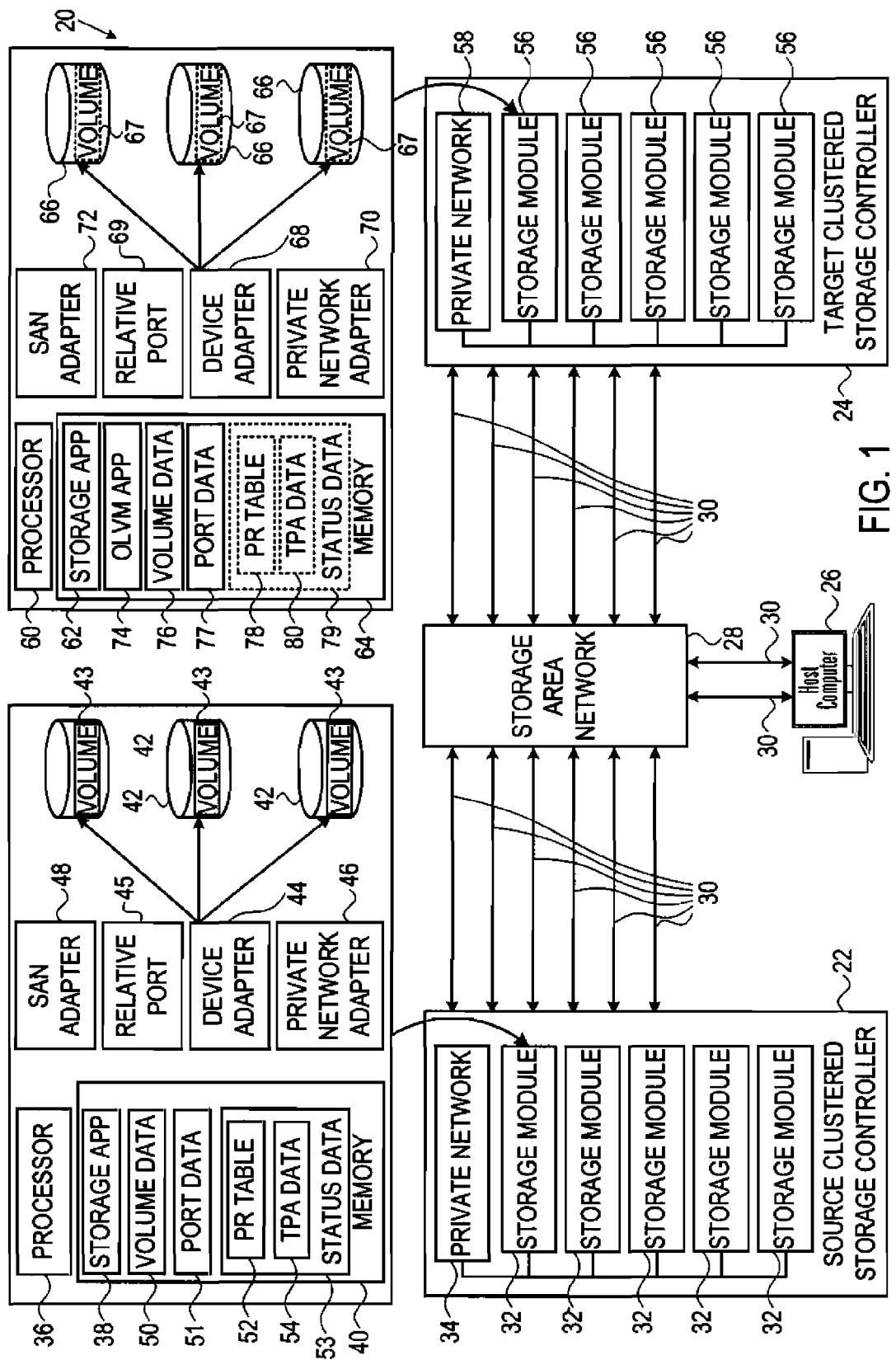
FIG. 1 is a schematic pictorial illustration of storage controllers implementing online volume migration, in accordance with an embodiment of the present invention.

FIG. 1 is a schematic pictorial illustration of a system 20 that implements online volume migration while configuring data migration, in accordance with an embodiment of the present invention. System 20 comprises a source storage controller 22, a target storage controller 24, and a host computer 26, which are all coupled to a storage area network (SAN) 28 via input/output (I/O) paths 30.

Source storage controller 22 comprises multiple source storage modules 32 coupled via a private network 34. Each source storage module 32 comprises a processor 36 configured to execute a storage module application 38 from a memory 40. Each source storage module 32 manages a number of source storage devices 42 (e.g., disk drives) that store a source volume 43. In the configuration shown in FIG. 1, source volume 43 is distributed among source storage devices 42, and comprises a single logical storage area in system 20.

The source storage devices are coupled to source storage module 32 via a device adapter 44. The source storage modules are coupled to private network 34 via a private network adapter 46, and to SAN 28 via a SAN adapter 48.

Memory 40 also stores volume data 50 that stores identification data for source volume 43, port data 51 (described in further detail hereinbelow), and status data 53 for source storage controller 22. Examples of information stored in status data 53 include a persistent reservation (PR) table 52, and thin provision allocation (TPA) data 54. Persistent reservation table 52 stores information on the sharing status of source volume 43. For example, source volume 43 may be locked (i.e., reserved) for reading and/or writing by host computer 26, or any other host computer (not shown) coupled to SAN 28.

If source storage controller 22 implements thin provisioning (a mechanism that allows source storage controller 22 to allocate source volume 43 to host computer 26 on a just-in-time basis), then TPA data 54 stores volume allocation data for the source storage controller.

Target storage controller 24 comprises multiple target storage modules 56 coupled via a private network 58. Each target storage module 56 comprises a processor 60 configured to execute a storage module application 62 from a memory 64. Each target storage module 56 manages a number of target storage devices 66 that store a target volume 67. In the configuration shown in FIG. 1, target volume 67 is distributed among storage devices 66, and comprises a single logical storage area in system 20.

The target storage devices are coupled to target storage module 56 via a device adapter 68. The target storage modules are coupled to private network 58 via a private network adapter 70, and to SAN 28 via a SAN adapter 72.

As described in further detail hereinbelow, processor 60 also executes an online volume migration (OLVM) application 74 from memory 64. In alternative configurations, OLVM application 74 can be executed by host computer 26, or by processor 36 from memory 40. While configuring data migration from source storage controller 22 to target storage controller 24, OLVM application 74 copies volume data 50 and status data 53 (i.e., PR table 52 and TPA data 54) from memory 40 to volume data 76 and status data 79 (i.e., a PR table 78 and TPA data 80, respectively) in memory 64. Memory 64 also stores port data 77 (described in further detail hereinbelow).

Examples of SAN adapters 48 and 72 include switched fabric adapters such as Fibre Channel (FC) adapters, Internet Small Computer System Interface (iSCSI) adapters, Fibre Channel over Ethernet (FCoE) adapters and Infiniband™ adapters. Examples of device adapters 44 and 68 include International Business Machines (IBM) ServeRAID™ M5000 series adapters, which implement both Serial Advance Technology Attachment (SATA) and Serial Attached SCSI (SAS) computer bus interfaces. Storage devices 42 and 66 typically comprise a combination of high capacity hard disk drives and solid-state disk drives.

Processors 36 and 60 typically comprise general-purpose computers, which are programmed in software to carry out the functions described herein. The software may be downloaded to memories 40 and 64 in electronic form, over a network, for example, or it may be provided on non-transitory tangible media, such as optical, magnetic or electronic memory media. Alternatively, some or all of the functions of processors 36 and 60 may be carried out by dedicated or programmable digital hardware components, or using a combination of hardware and software elements.

Source volume 43 is coupled to host computer 26 via a relative port 45 in the source storage controller, and target volume 67 is coupled to the host computer via a relative port 69 in the target storage controller. A relative port represents a logical path that the host computer can use to communicate with volumes 43 and 67. While the configuration in FIG. 1 shows each the storage controllers including a single relative port (i.e., relative ports 45 and 69), each of the storage controllers typically comprise multiple relative ports.

Each of the logical paths in storage controllers 22 and 24 typically has a unique relative port identifier. The relative port identifier can refer to a physical slot (not shown) in a specific storage module. For example, if there are five source storage modules (i.e., 0-4) in source storage controller 22, and each source storage module 32 comprises 8 slots (i.e., 0-7), then relative port identifier "0205" can indicate that device adapter 44 is positioned in the sixth ("05") slot of the third ("02") source storage module.

Asynchronous Logical Unit Access (ALUA), also known as Target Port Group Support (TPGS) is a Small Computer System Interface (SCSI) protocol that enables storage controllers 22 and 24 to set the state of each of their respective relative ports. SCSI Primary Commands (SPC) supporting ALUA/TPGS are specified in section 5.8 of SPC-3 and sections 5.8 and 5.11 of SPC-4, from the T10 committee of the InterNational Committee on Information Technology Standards (INCITS), whose disclosure is incorporated herein by reference.

Using ALUA, host computer 26 can also query system 20 and receive the states of each of the logical paths to the storage controllers. For example, since source volume 43 is coupled to host computer 26 via relative port 45, setting the state of relative port 45 sets the state of each logical path between the source volume and host computer 26 coupled via relative port 45.

ALUA states include (1) Active Optimized, (2) Active Non-Optimized, (3) Standby, (4) Unavailable, (5) Transitioning, and (6) Offline. In embodiments of the present invention described herein, the ALUA states are combined as follows:

Active: Active Optimized and Active Non-Optimized.
Inactive: Standby, Unavailable, Transitioning and Offline.
Additionally, the relative ports can be divided into groups (also referred to herein as target port groups), enabling system 20 to set the state of the relative ports and the logical paths at the group level. For example, if the relative ports in first source storage controller 22 (including relative port 45) are assigned to Group 0 (via the Report TPGS SCSI command), and the relative ports in second target storage controller 24 (including relative port 69) are assigned to Group 1. System 20 can set the state of the logical paths between the host computer and source storage controller 22 by setting the state of Group 0. Likewise, system 20 can set the state of the logical paths between the host computer and the target storage controller 24 by setting the state of Group 1.

Furthermore, dividing the relative ports into groups helps define a unique relative port identifier, since (as in the example presented above), device adapter 44 may be installed in the sixth slot of the third source storage module 32 of source storage controller 22, and device adapter 68 may be installed in the sixth slot of the third target storage module 56 of target storage controller 24. Therefore, the group identifier and the relative port identifier can be joined to make a combined identifier (i.e., a tuple comprising the group identifier and the relative port identifier), to uniquely identify each of the relative ports in system 20.

There may be instances where host computer 26 executes an operating system that identifies each of the logical paths by a relative port identifier only. In these instances, during an initialization phase of the embodiments described herein, processors 36 and 60 coordinate with each other to assign unique relative port identifiers to each of the relative ports in system 20. The unique relative port identifiers can be used to represent each of the relative ports and their respective logical paths.

During the initialization phase, in addition to identifying the relative ports, processors 36 and 60 typically assign a unique volume identifier, e.g., a serial number to each of volumes 43 and 67. Processor 36 stores the unique volume identifiers for source volume 43 to volume data 50 in memory 40, which is coupled to the source volumes. Processor 60 stores the unique volume identifiers for target volume 67 to volume data 76 in memory 64, which is coupled to the target volume.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Online Volume Migration

Figure 2:
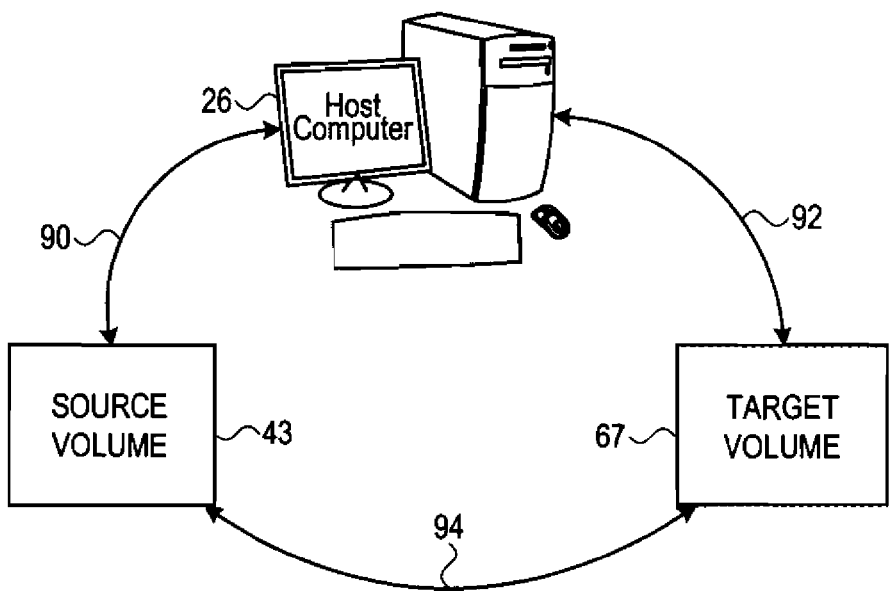
FIG. 2 is a schematic pictorial illustration of logical paths between a source volume, a target volume, and a host computer, in accordance with an embodiment of the present invention.

FIG. 2 is a schematic pictorial illustration, showing logical paths between source volume 43 (also referred to herein as the first volume), target volume 67 (also referred to herein as the second volume) and host computer 26. A logical path between two devices indicates how the coupling of the two devices appears to the network. For example, the configuration shown in FIG. 2 shows source volume 43, target volume 67 and host computer 26 arranged in a ring network topology. The actual physical connections between the devices (e.g., via I/O paths 30) will typically differ from the logical paths.

In the configuration shown in FIG. 2, host computer 26 is coupled to source volume 43 via a logical path 90, and the host computer is coupled to target volume 67 via a logical path 92. Source volume 43 and target volume 67 are coupled via a logical path 94, which is a communication path that can be used for migrating data from the source volume to the target volume.

When implementing SAN topologies such as Fibre Channel, each of the logical paths typically comprises a combination of physical connections, as indicated by I/O paths 30 in FIG. 1. Using multiple logical paths, also called multipath I/O, can provide fault tolerance, since system 20 can route network traffic through an alternative logical path upon a failure in one of the logical paths. Additionally, multipath I/O can enhance performance, since data to be transferred can be spread out over multiple logical paths.

Figure 3:
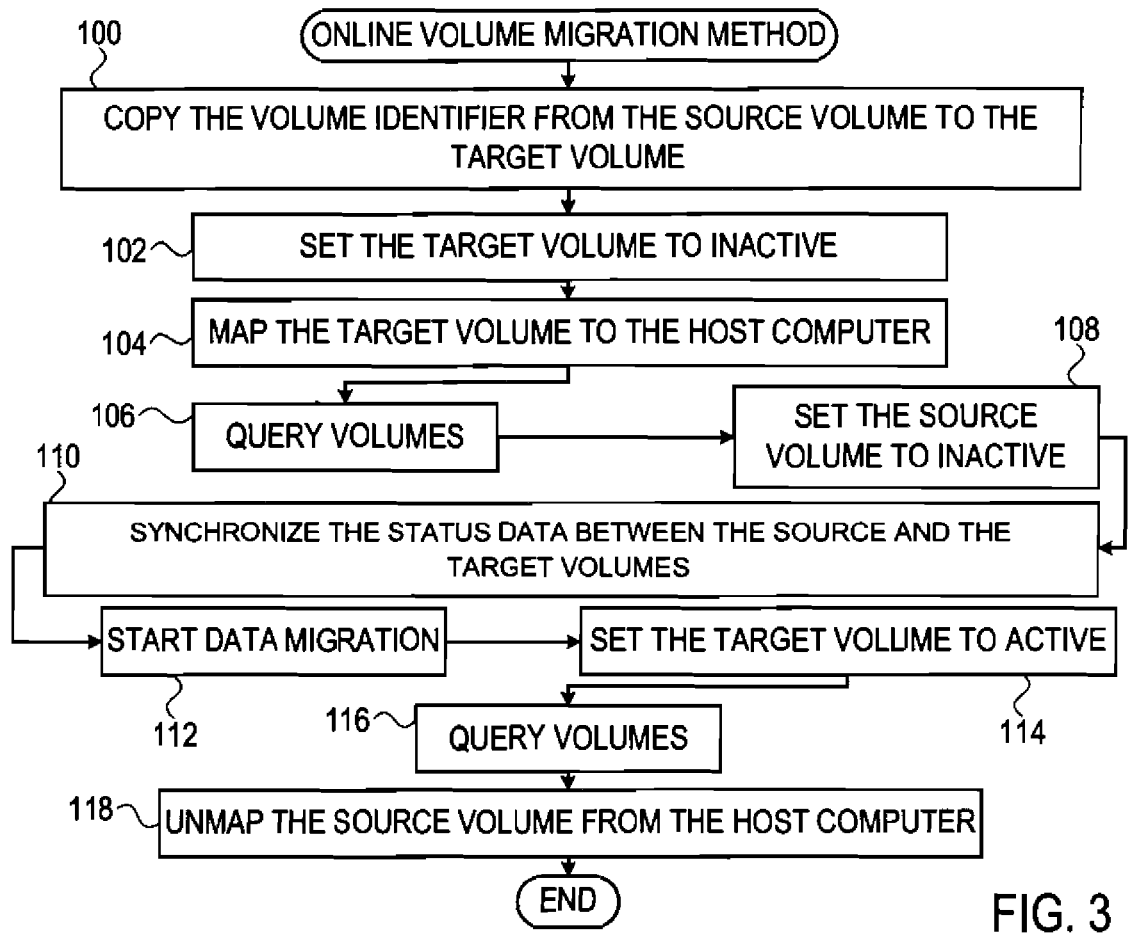
FIG. 3 is a flow diagram that schematically illustrates an online volume migration method, in accordance with an embodiment of the present invention.

FIG. 3 is a flow diagram that schematically illustrates a method of online volume migration, in accordance with an embodiment of the present invention. In an initial step 100, processor 60 copies the volume identifier from the source volume to the target volume. To copy the volume identifier, OLVM application 74 copies volume data 50 to volume data 76. Host computer 26 then retrieves the copied volume identifier from volume data 76, thereby joining logical paths between the host computer and the first volume with logical paths between the host computer and the second volume.

Prior to initial step 100, processor 60 set the first volume to the active state and mapped the first volume to host computer 26, thereby enabling the host computer to read data from and write data to the first volume. To set the first volume to the active state, processor 36 can set the target port group associated with the first volume (i.e., the target port group that includes relative port 45) to the active state, thereby setting the logical paths associated with logical path 90 to the active state.

Additionally (i.e., prior to the initial step), host computer queried system 20 to identify and determine the states of the volumes mapped to the host computer. To query system 20, host computer 26 calls a SAN function call that returns all the logical paths to the storage controllers in system 20. For each returned logical path, host computer 26 executes the SCSI Report LUNS command, which returns a logical unit number (LUN) for each device on the returned logical path. Host computer 26 then executes the SCSI Inquiry command for each returned LUN and path, first querying Enable Vital Product Data (EVPD) page 80 (hexadecimal) to retrieve the volume identifier, and then querying EVPD page 83 (hexadecimal) retrieve the group and the relative port identifier associated with each LUN. Finally, for each of retrieved group identifiers, host computer executes the Report TPGS command to retrieve the state of each of the groups (i.e., the target port group).

Based on the information retrieved by querying system 20, host computer 26 can define multipath devices and ascertain the state of every logical path to each multipath device. Since there may be multiple logical paths between host computer 26 and each of the volumes, the host computer may detect multiple instances of the same volume (identified by the associated volume identifier), where each instance is via a different logical path.

In a first state set step 102, processor 60 sets the state of the second volume (i.e., target volume 67) to inactive. To set the second volume to the inactive state, processor 60 can set the target port group associated with the second volume (i.e., the target port group that includes relative port 69) to the inactive state, thereby setting the logical paths associated with logical path 92 to the inactive state.

In some embodiments, processor 60 sets the state of the second volume (and thereby the states of the logical paths between host computer 26 and the second volume) by setting the state of the target port group associated with the relative ports in target storage controller 24. For example, if Group 0 comprises the relative ports in source storage controller 22 (including relative port 45) and Group 1 comprises the relative ports in target storage controller 24 (including relative port 69), then processor 60 sets Group 1 to the inactive state, thereby setting the target volume to the inactive state as well.

In an alternative embodiment, the state of each group remains constant, but the relative ports included in the target port groups change as needed. For example, if Group 0 is in the active state and Group 1 is in the inactive state, processor 60 can allocate the relative ports of target storage controller 24 (including relative port 69) to Group 0, thereby setting the target volume to the active state. Alternatively, processor 60 can allocate the relative ports of the target storage controller (including relative port 69) to Group 1, thereby setting the target volume to the inactive state.

In a mapping step 104, OLVM application 74 maps (i.e., logically connects) the inactive second volume to host computer 26, and conveys a request to host computer 26 to query system 20. In a first query step 106, the host computer queries system 20 to identify and determine the states of the volumes (including the first and the second volumes) mapped to the host computer.

Upon querying the volumes in step 106, processor 36 reports the state of the first volume and the logical paths between the first volume and host computer 26 as active, and processor 60 reports the state of the second volume and the logical paths between the second volume and the host computer as inactive. Additionally, since the same identifier (i.e., from the source volume) is now associated with both the first volume and the second volume, the second volume is now "masquerading" as the first volume. In other words, host computer 26 identifies the first volume and the second volume as a single multipath device, with the logical paths associated with logical path 90 in the active state, and the logical paths associated with logical path 92 in the inactive state.

In a second state set step 108, upon receiving a request from OLVM application 74, processor 36 sets the state of the first volume to inactive. To set the first volume to the inactive state, processor 36 can set the target port group that is associated with the first volume (i.e., that target port group that includes relative port 45) to the inactive state, thereby setting the logical paths associated with logical path 90 to the inactive state.

In a synchronize status step 110, OLVM application 74 synchronizes status data 53 with status data 79. To synchronize status data 53, OLVM application 74 synchronizes persistent reservation table 52 with persistent reservation table 78. If source storage controller 22 is configured for thin provisioning, then OLVM application 74 may synchronize thin provision allocation data 54 with this provision allocation data 80.

To set the source and the target volumes to inactive, OLVM application 74 typically uses the Unavailable state or the Transitioning state as according to the SPC ALUA specification described supra. Since the Unavailable and the Transitioning states do not typically support persistent reservations, step 110 ensures that persistent reservation tables 52 and 78 are synchronized, even if one of the volumes is inactive. Alternatively, if host operating system 26 does not implement persistent reservations, then the ALUA Standby state can be used to set one of the volumes to inactive.

In some embodiments, the thin provisioning table can be used to determine which data blocks OLVM application 74 migrates from the source volume to the target volume, since only allocated (i.e., via thin provisioning) data blocks need to be migrated.

In a migration step 112, OLVM application 74 starts migrating the inactive first volume to the inactive second volume. In a third state set step 114, processor 60 sets the state of the second volume to active, and conveys a request to host computer 26 to requery system 20. To set the second volume to the active state, processor 60 can set the target port group that is associated with the second volume (i.e., the target port group that includes relative port 69) to the active state, thereby setting the logical paths associated with logical path 102 to the active state.

In a second query step 116, host computer 26 queries system 20 to identify and determine the states of the first and the second volumes, and their respective logical paths to the host computer. Finally (after all data has been copied from the source volume to the target volume), in an unmap step 118, upon receiving a request from OLVM application 74, processor 36 unmaps (i.e., logically disconnects) the first volume from host computer 26. After unmapping the source volume, processor 36 can either delete the first volume, or store a new identifier (i.e., a serial number) to volume data 50.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
configuring data migration from a first volume to a second volume, which are coupled via a storage area network (SAN) to a host computer, with the first volume mapped to the host computer, the first volume in communication with a first processor, and the second volume in communication with a second processor, by:
setting, using the first processor, the first volume to active, by setting a first target port group volume to active, thereby setting a state of all logical paths between the host computer and the first volume to active;
querying volumes mapped to the host computer to determine the states of the volumes mapped to the host computer to thereby define multipath devices and ascertain the state of every logical path to each multipath device;
after setting the first volume to active, copying a volume identifier associated with the first volume to a memory coupled to the second volume;
after setting the first volume to active, retrieving, by the host computer, the copied volume identifier of the first volume from the memory;
after setting the first volume to active, setting, using the second processor, a state of a second target port group comprising a port associated with the second volume to inactive, thereby setting a state of all logical paths between the host computer and the second volume to inactive;
after setting the first volume to active and the second volume to inactive and after the setting the state of the second target port group, mapping the inactive second volume to the host computer;
after the mapping of the inactive second volume to the host computer, sending a query to identify a state of the first volume and a state of the second volume mapped to the host computer;
determining from the query that the state of the first volume is active and the state of the second volume is inactive;
identifying the first volume and the second volume as a single multipath device, due to the volume identifier associated with the mapped first volume being in the memory;
setting, using the first processor, a state of the first volume to inactive, after the identifying;
synchronizing status data between the inactive first volume and the inactive second volume;
after the copying, starting data migration from the inactive first volume to the inactive second volume; and
after the starting, setting the state of the second volume to active.

2. The method according to claim 1, and comprising unmapping the first volume from the host computer upon setting the second volume to the active state.

3. The method according to claim 2, and comprising deleting the first volume upon unmapping the first volume from the host computer.

4. The method according to claim 2, and comprising replacing the volume identifier associated with the first volume with a new volume identifier upon unmapping the first volume from the host computer.

5. The method according to claim 1, wherein the status data is selected from a group consisting of a persistent reservation table and thin provisioning allocation data.

6. The method according to claim 1, wherein setting the state of the first volume to the inactive state comprises setting a state of a target port group associated with the first volume to the inactive state, thereby setting a state of all logical paths between the host computer and the first volume to the inactive state.

7. The method according to claim 1, wherein setting the state of the second volume to the active state comprises setting a state of a target port group associated with the second volume to the active state, thereby setting a state of all logical paths between the host computer and the second volume to the active state.

* * * * *